US009021148B2

(12) United States Patent
Cardona et al.

(10) Patent No.: US 9,021,148 B2
(45) Date of Patent: Apr. 28, 2015

(54) FAST PATH USERSPACE RDMA RESOURCE ERROR DETECTION

(71) Applicant: International Business Machines Corporation, Armonk, NY (US)

(72) Inventors: Omar Cardona, Cedar Park, TX (US); Matthew R. Ochs, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/081,113

(22) Filed: Nov. 15, 2013

(65) Prior Publication Data
US 2015/0089303 A1 Mar. 26, 2015

Related U.S. Application Data

(63) Continuation of application No. 14/037,428, filed on Sep. 26, 2013.

(51) Int. Cl.
*G06F 3/06* (2006.01)
*G06F 11/20* (2006.01)
*G06F 13/28* (2006.01)
*G06F 13/38* (2006.01)

(52) U.S. Cl.
CPC ............ *G06F 11/2046* (2013.01); *G06F 13/28* (2013.01)

(58) Field of Classification Search
None
See application file for complete search history.

(56) References Cited

U.S. PATENT DOCUMENTS

| 5,974,249 | A | 10/1999 | Elliott et al. |
| 6,629,166 | B1 | 9/2003 | Grun |
| 8,023,417 | B2 | 9/2011 | Blackmore et al. |
| 2004/0199808 | A1 | 10/2004 | Freimuth et al. |
| 2006/0253859 | A1 | 11/2006 | Dai et al. |
| 2012/0089694 | A1* | 4/2012 | Pandya ......................... 709/212 |

OTHER PUBLICATIONS

U.S. Appl. No. 14/037,428.
PCT Notification of Transmittal of the International Search Report and the Written Opinion of the International Searching Authority, or the Declaration (PCT/ISA/220), the International Search Report (PCT/ISA/210) and the Written Opinion of the International Searching Authority (PCT/ISA/237), International Application No. PCT/EP2014/068084 dated Oct. 23, 2014, 12 pages.
Cardona, Omar, "RAS Enhancements for RDMA Communications", University Texas at Austin, Dec. 2010, 81 pages.

* cited by examiner

*Primary Examiner* — Scott Sun
(74) *Attorney, Agent, or Firm* — Stephen J. Walder, Jr.; Thomas E. Tyson

(57) ABSTRACT

Mechanisms are provided for providing an early warning of an error state of a remote direct memory access (RDMA) resource to a userspace application. The mechanisms detect, using kernelspace logic, an error event having occurred, and perform a write operation to write an error state value to a userspace shared memory state data structure indicating the RDMA resource to be in an error state. The mechanisms detect, using userspace logic, the RDMA resource being in an error state by reading the error state value from the userspace shared memory state data structure in response to a userspace application attempting to perform a RDMA operation using the RDMA resource. In addition, the mechanisms initiate, by the userspace application, an operation to tear down the RDMA resource in response to detecting the RDMA resource being in the error state.

10 Claims, 5 Drawing Sheets

FAST PATH USERSPACE RDMA RESOURCE ERROR DETECTION

This application is a continuation of application Ser. No. 14/037,428, filed Sep. 26, 2013, status pending.

BACKGROUND

The present application relates generally to an improved data processing apparatus and method and more specifically to mechanisms for performing fast path userspace Remote Direct Memory Access (RDMA) resource error detection.

Remote Direct Memory Access (RDMA) is a functionality that allows direct memory access from the memory of one computer into that of another computer without involving either computer's operating system. RDMA facilitates high throughput, low-latency networking, which is especially useful in massively parallel computer clusters.

RDMA supports zero-copy networking by enabling the network adapter of a computer to transfer data directly to or from application memory, thereby eliminating the need to copy data between the application memory and the data buffers in the operating system. Such direct transfers of data do not require any work to be done by the processors, cache memories, or the like, and do not require context switches. Such direct transfers may be performed in parallel with other system operations that the computers are performing. For example, when an application performs a RDMA Read or Write request, the application data is delivered directly to the network via a RDMA enabled network adapter, reducing the latency of the transfer.

Many modern architectures and specifications are designed with RDMA and RDMA enabled network adapters in mind. For example, the InfiniBand™ specification maintained and furthered by the InfiniBand™ Trade Association (IBTA), and InfiniBand™ architectures developed by International Business Machines Corporation of Armonk, N.Y., provide support for RDMA operations to be performed via the InfiniBand™ fabric. Similarly, the Open Fabrics Enterprise Distribution (OFED™) specification and architecture, maintained and furthered by the Open Fabrics Alliance (OFA), and which is built upon the InfiniBand™ specification, also provides support for ROMA operations. For more information about InfiniBand™ and OFED™, additional information may be obtained from the IBTA and OFA organizations and corresponding websites.

SUMMARY

In one illustrative embodiment, a method, in a data processing system comprising a processor and a memory, for providing an early warning of an error state of a remote direct memory access (RDMA) resource to a userspace application is provided. The method comprises detecting, by kernelspace logic of the data processing system, an error event having occurred. The method further comprises performing, by the kernelspace logic, a write operation to write an error state value to a userspace shared memory state data structure indicating the RDMA resource to be in an error state. The method also comprises detecting, by userspace logic of the data processing system, the RDMA resource being in an error state by reading the error state value from the userspace shared memory state data structure in response to a userspace application attempting to perform a RDMA operation using the RDMA resource. In addition, the method comprises initiating, by the userspace application, an operation to tear down the RDMA resource in response to detecting the RDMA resource being in the error state.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
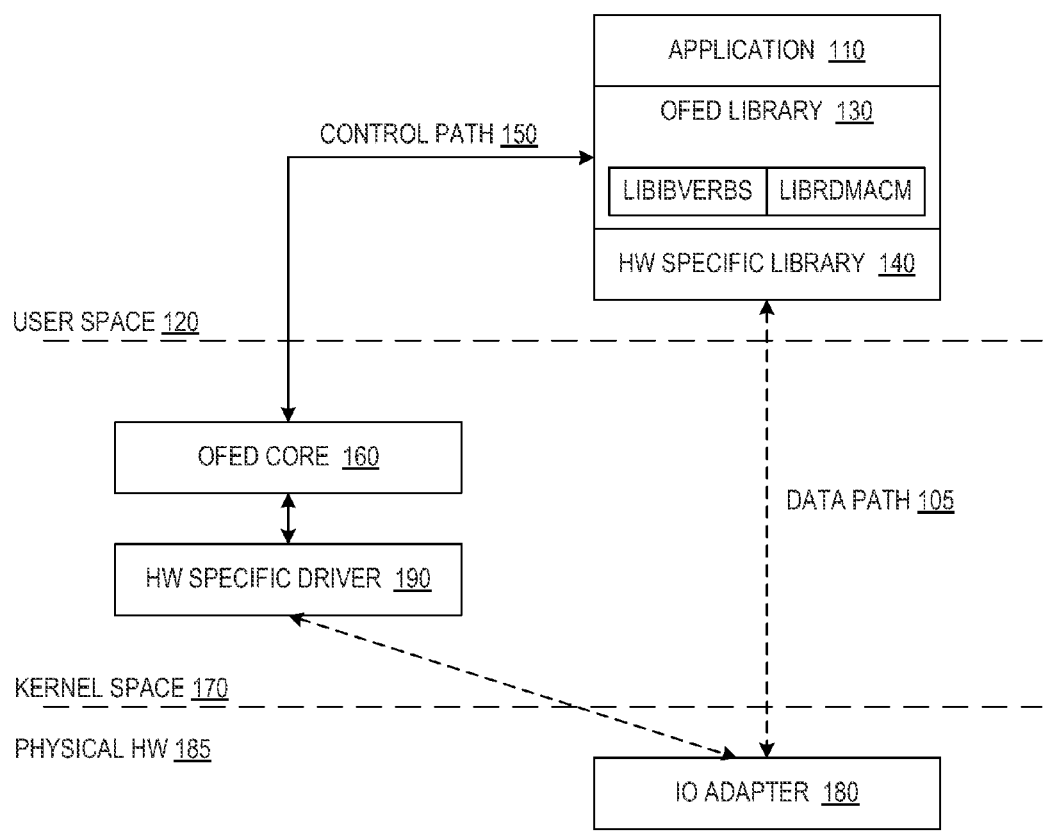
FIG. 1 is an example of an RDMA model that utilizes an Open Fabrics Enterprise Distribution (OFED™) core in accordance with one illustrative embodiment.

High performance Remote Direct Memory Access (RDMA) applications, such as the DB2-Purescale application or WebSphere-ExtremeScale application, both available from International Business Machines Corporation of Armonk, N.Y., use thousands of connections in userspace (i.e. the portion of system memory allocated for the execution of applications and storage of application data as opposed to kernelspace which is the portion of system memory allocated for execution of an operating system kernel and storing kernel related data). Normally if these connections are sockets, where the context (a control structure that is representative the resources used for communication) and state of the connection is operating system kernel mediated, then outages, such as input/output (IO) adapter or interface errors, are graciously handled at the lowest layer possible, typically at the Open Systems Interconnection (OSI) L2 (data link layer) domain. Existing mechanisms to contain the error at the lowest possible layer include Link Aggregation Control Protocol (LACP) or other combinations of link/interface aggregation.

Problems arise in that the high performance RDMA applications require a fast and efficient error/termination feature due to these applications being exposed to OSI L1-L4 errors because of the fact that they use kernel bypass IO architectures, such as RDMA and stateful offload IO technologies. These high performance RDMA applications use RDMA to achieve a highest performance and responsiveness from the IO connections but in turn expose themselves to such OSI L1-L4 errors.

However, RDMA and combinations thereof with stateful offload IO technologies, do not interoperate with standard OSI L2 aggregation models. With stateful offload 10 and RDMA, the operating system provides connection state information to the IO adapters and hands off the processing of communications of data through these connections to the IO adapter itself; e.g., TCP/IP protocol stack processing or the like. These IO adapters encompass the standard OSI network and transport layers (layers 3 and 4) within the physical adapter domain, i.e. the hardware of the IO adapter is the container of the equivalent of a socket context and connection state. This differs from traditional kernel mediated multiplexed communication where the OSI layers 2-n are resident in the operating system. As a result of the IO adapter hardware containing the OSI network and transport layers, an error, such as an Enhanced Error Handling (EEH) event (i.e. Peripheral Component Interconnect (PCI) error), results in the immediate termination of all associated connections.

As mentioned above, RDMA applications may use thousands of connections, and thus, thousands of connection resources. For example, in an InfiniBand™ or OFED™ architecture, each connection may comprise a Queue Pair (QP), Completion Queue (CQ), Protection Domain (PD), Context (CTX) data structures, and the like. Thus, for an RDMA application having thousands of connections, there may be thousands of these QPs, CQs, PDs, CTXs, and the like, each of which are referred to herein as a "resource." Each unique resource must be torn down or destroyed in response to a detected connection error. The termination process to destroy these resources is a sequential control path process in known technologies, e.g., in the OFED™ architecture. This results in a high software execution time cost which increases as the number of resources increase. Thus, termination time grows as well and becomes noticeable to end users. This sequential tearing down or destruction or resources is referred to herein as a "slow path" termination or destruction of resources.

The illustrative embodiments provide a model to allow for fast path application notification of error conditions such that massively parallel applications, such as DB2-PureScale and WebSphere-ExtremeScale, can perform concurrent termination of all userspace resources on error detection. That is, the illustrative embodiments provide a model for early warning of an impending serialized formal termination (slow path termination) through the existing architecture termination mechanisms, e.g., OFED™ verbs via file descriptor close. Because of this early warning, resources may begin being torn down or destroyed prior to the formal serialized termination process being performed or prior to that serialized termination process reaching the particular resource, thereby reducing the execution time of the serialized termination process.

For example, using OFED™ as an example architecture, the present state of the art mechanisms for performing error notifications is based purely on a kernelspace IO adapter device driver performing a call to the operating system kernel, e.g., an OFED™ core logic element, such as by way of a ib_dispatch_event( ) call into the OFED™ core of the operating system kernelspace with the IB_EVENT_DEVICE_FATAL flag set. This in turn causes the OFED™ core logic to walk a list of open file descriptors (abstract indicators of files that may serve as an index into a kernel array data structure containing details of open files) and perform a close operation for each application instance. This is a coarse solution for applications sensitive to file descriptor close operations, i.e. applications that perform an additional action when they receive a close operation (not just freeing the resources).

The series of calls to close each file descriptor and free the memory associated with each and every RDMA resource, e.g., QP, CQ, PD, CTX, etc., is quite extensive and time consuming as the number of resources grows. As an example, a heavily used IO adapter with 64K QPs, 128K CQs, 16K PDs, etc., can potentially extend the time to perform EEH recovery as well as exhibit an obvious difference in time to complete the ifconfig detach command (a command used by users to disconnect RDMA interfaces) for the user interface, and make these processes clearly visible to the user, or other processes, as well as introduce potential variables in a cascading error syndrome. For example, a script that is configured to recycle an interface by performing an ifconfig detach operation but that has logic to time out in error after a minute has passed without success would suffer from this extension of time to compete the ifconfig detach operation. In this scenario, the error on the adapter has led to an extended ifconfig detach cycle, which in turn has lead to a misdiagnosed hang condition, i.e. a cascaded error.

To address the drawbacks of present error notification and resource freeing operations, the illustrative embodiments provide mechanisms for fast path userspace Remote Direct Memory Access (RDMA) resource error detection and early resource termination. In the following description of the illustrative embodiments, the concepts of address space, shared memory state, context, and shadow copies of resources will be used to explain the mechanisms of the illustrative embodiments and their operation. As such, the following is a brief initial discussion of these concepts to aid in understanding the description of the illustrative embodiments following thereafter.

Address Spaces and Cross Memory Services:

Modern computing systems separate system memory into a user memory space, allocated to and accessible by user space applications, and a kernel memory space, allocated to and accessible by the operating system kernel. The illustrative embodiments utilize cross-memory services (referred to herein as "XMAP") to access (read and write) a shared memory structure while operating in kernelspace. These cross-memory services are utilized because the kernel does not share the same address space as a user process. Likewise, each user process (user application) has an independent user address space. In simple terms, the illustrative embodiments use cross-memory services in situations where information is passed between the kernel and user address spaces.

There are two main roles of the cross-memory services: (1) Setup and tear down of the access to a shared region of memory; and (2) access to the shared region of memory (from the kernel side). Setup and tear down of the access to a shared region of memory involves calling into a kernel service with references (memory addresses) to a handle and to the area of memory to be "shared" (explained in next section), and a length of the region to be shared. The service uses the handle to store information about the address spaces among other things. This is required so that when there is a need to access the shared memory from the kernel, the different address spaces can be correlated. Therefore, this implies that the cross-memory services are required when accessing the shared region of memory while operating in the kernel. Once the setup is complete, the data residing within the shared region of memory is "visible" to both user space and kernel space logic. Within the industry, there are different ways of referring to the act of setting up the shared region of memory including "mapping," "attaching," and the like. In the AIX operating system, for example, the terms "attach" and "detach" are utilized with kernel services for setting up and tearing down the shared region of memory being the "xmattach" service and "xmdetach" service.

With regard to accessing the shared region of memory from the kernel side, this involves reading and writing to the shared region of memory. Due to the different address spaces, the kernel cannot simply read/write directly to the shared region of memory. Instead, the kernel uses the input/output cross-memory routines, providing the handle that was populated during the setup along with the user and kernel addresses to perform the access. From the userspace side, the data is read/written as normal.

Shared Memory State:

Expanding further on the address space and cross memory services discussion above, one aspect of the illustrative embodiments is to extend each user space root control structure with a "shared memory state structure." The "shared memory state" can be broken down into two parts. The word "state" refers to the condition of the IO adapter resources. In one illustrative embodiment, this state is binary: error or non-error. The "shared memory" portion refers to using the cross-memory services to access memory owned by, and resident in, user space. The kernel also maintains this data in its shadow copy. Thus, the word "shared" may be considered a bit of a misnomer in this sense as it is not the exact same memory but rather the illusion of being shared by using the aforementioned cross-memory services.

Context:

Unless otherwise stated, the context is a root control structure that is a management structure that contains information about, and references to, communication resources. In programmatic terms, the context is a large data structure whose reference (memory address of the data structure) is used to access user specific resource data. A user application using RDMA is associated with a context.

Shadow Copy:

For the purposes of the description of the illustrative embodiments, a shadow copy is a kernel resident copy of either an entire data structure or of particular members (or elements) of a data structure for the purpose of keeping track of data residing in different address spaces. It is not the case that every piece of information related to I/O is resident in both the original copy and the shadow copy (every buffer is not replicated as that undermines the purpose of zero copy in RDMA) of the data structure. The shadow copy also provides a means to correlate data in a reverse-lookup fashion. For example, events coming from the IO adapter (handled in kernel space) need to be presented to a user and the information used to provide such presentation is provided in the shadow copy of the data structure for the resource. With particular importance to the illustrative embodiments, the shadow copy of the context is the location where the shared memory resides.

As mentioned above, the illustrative embodiments extend each userspace root control structure (i.e. CTX/context) with a shared memory state structure. This shared memory state structure is cross-memory mapped, i.e. accessible by both userspace applications and the kernel, via cross memory map services provided in the kernelspace. If an error event occurs, such as a FATAL error event type, and is detected by the kernelspace IO adapter device driver, the kernelspace IO adapter device driver walks a pre-existing list of userspace root level shadow contexts and performs a cross memory write of the state from kernelspace, e.g., a state of the adapter indicating an error or non-error state, to each and every userspace context structure associated with the RDMA resource that is in an error state. This is a very low cost asynchronous memory write operation from the kernelspace IO adapter device driver to each context (low cost in terms of processor cycles and having to utilize a formal serialized process).

The userspace shared memory state structure of the userspace root control structure is validated on every RDMA entrypoint into a resource, i.e. every memory address corresponding to a RDMA resource as the destination of the application operation. Thus, an invalid state, e.g., an error state, is detected on any application operation accessing the RDMA resources, e.g., QP, CQ, PD, CTX, etc., and a null value or an error result value is returned to the calling application indicating the error state. As a result of detecting this error, the application initiates operations to terminate all resources associated with the resource from which the error state was detected, e.g., the adapter, a particular hardware resource of the adapter, such as an external port, memory bank, or the like. Hence, the application begins pro-actively performing termination of resources early in response to detecting the error state from the shared memory state structure of the userspace root control structure. Thus, the shared memory state structure provides an early warning mechanism which allows the application to detect the error state on operations prior to the file descriptor close operations performed by the kernel, e.g., OFED™ core logic.

During normal operation, the userspace application uses the RDMA resources, e.g., QPs, CQs, PDs, etc., as normal. At some point, a disruption may occur on the RDMA connection between the userspace application and the IO adapter. For example, this may be an EEH event, a catastrophic error notification from the IO adapter, or even an ifconfig detach of the associated IO adapter interface. In response to these scenarios, the kernelspace IO adapter device driver performs a lookup operation of the existing CTX shadow structures for the affected resource(s) which provides information regarding the userspace resource(s). For each CTX shadow structure instance, the kernelspace IO adapter device driver performs a cross memory write operation to the shared memory substructures of the CTX shadow structures, and thereby the shared memory substructure of the userspace CTX structures, for the affected resource(s) with an error flag set to indicate that the resource is currently in an error state.

After performing the cross memory write operation to the shared memory substructures when the userspace application subsequently attempts to use the resources as normal, the userspace application detects the error state of the resource from the shared memory substructure whenever it calls into any of the hardware specific library entrypoints. In response to the detection of the error state, the userspace application performs termination operations of all associated resources. Parallel destruction of the resources is thus made possible. Idle userspace applications will receive standard notification of the error state, i.e. slow-path error notification, via file descriptor close operations.

Because active RDMA resources are destroyed early by the userspace application in response to detecting the error state identified in the shared memory substructure of the context data structures of the resources, when the OFED file descriptor close operations are performed, the OFED core logic needs to terminate only the remaining resources not addressed by the fast-path termination logic of the application performing termination based on the detected error state in the shared memory substructures. As a result, the file descriptor close operations of the slow-path error notification serves as a failsafe operation.

Thus, because the higher level application resource termination processes execute before the file descriptor close operations performed by the kernel or core logic in the kernelspace (as part of the slow path termination of resources), concurrent and early termination of all resources is made possible based on resource usage. This is a significant improvement over the exclusive serial termination process (slow path) employed by the kernel which significantly reduces termination process time.

Moreover, the illustrative embodiments effectively transform the standard file descriptor close operations into a safety check for any idle application resources rather than a serial destruction of each resource that extends the recovery times as previously discussed above. That is since the application performs early tear down or destruction of the resources due to the detection of the error state via the shared memory state structure, when the slow path file descriptor close operations are performed, many of the resources will already have been torn down and may essentially be skipped during the slow path termination operation. Hence, the mechanisms of the illustrative embodiments further increase the speed of the slow path file descriptor close operations do to concurrent and early tear down or destruction of resources associated with an error state.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, device, or manufacture of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

To further illustrate the mechanisms and their operations in accordance with the illustrative embodiments, reference is now made to the figures which depict example embodiments. FIG. 1 is an example of an RDMA model that utilizes an Open Fabrics Enterprise Distribution (OFED™) core in accordance with one illustrative embodiment. It should be appreciated that the elements of the userspace and kernelspace shown in FIG. 1 may be implemented as software instructions executed by one or more processors of a host system. The IO adapter in the physical hardware level of FIG. 1 may be implemented as a hardware device in which software instructions are executed on one or more processors, firmware is provided, memory is provided, and/or the like, to facilitate operations being performed by the IO adapter hardware.

As shown in FIG. 1, an application 110 is present in the user space 120 and makes calls to, or otherwise invokes, library functions for performing RDMA operations via an OFED™ library 130 and hardware specific library 140. The OFED library 130 comprises verbs library (libibverbs) and DMA connection manager library (librdmacm) which may be used via a control path 150 to communicate with an OFED core 160 in the kernelspace 170 of the operating system. The verbs is in the library 130 are a part of the OFED™ package and provide the applications linking to the library 130, e.g., application 110, with the verb Application Program Interface (API) that the application can use to make use of RDMA functions. Both sub-libraries libibverbs and librdmacm contain verbs with the libibverbs being resource related while the librdmacm verbs are used to handle the protocol to connect queue pairs between the local and remote systems. In essence, the OFED™ library 130 contains the application level support for the defacto standard of OFED™ and provides the APIs for implementation of RDMA.

The OFED™ core 160 provides the remaining portions of the OFED™ RDMA mechanisms including the operating system kernel level verb APIs as well as the bulk of the hardware agnostic implementation of the RDMA protocol. The OFED™ core 160 may communicate with the IO adapter 180 at the physical hardware level 185 via a hardware specific device driver 190. The hardware specific device driver 190 and the hardware specific library 140 may be specific to the type of IO adapter 180 being used in the particular implementation.

As can be seen from FIG. 1, the data path 105 flows directly from the application 110 in the user space 120 to the IO adapter 180 in the physical hardware level 185, and vice versa, via RDMA operations performed using the OFED™ library 130 and hardware specific library 140. Control path communications with the IO adapter 180 are still routed via the control path 150 to the OFED™ core 160 and hardware specific device driver 190 in the kernel space 170.

Using this architecture, the upper layer protocol (ULP) performs resource creation on the IO adapter 180. It should be appreciated that ULP refers to either application or other code that is higher up on the protocol stack in a protocol model, e.g., the OSI model. For example, code that is directly using the OFED™ verbs may be an application at an application layer, but could also be user Direct Access Programming Library (uDAPL), i.e. an application space user, that could be used in turn by a middleware layer that is itself used by the application, e.g., DB2 for example. The term ULP refers to the direct user of the code in this scenario (i.e. the direct user of the OFED verbs), without narrowing the ULP to an application which may be many levels removed.

The ULP performs explicit calls to allocate and map resources for Direct Memory Access (DMA) on the device, e.g., the IO adapter 180. Thus, the RDMA driver, i.e. a device driver instance for the particular device, e.g., IO adapter 180, which is registered by the hardware specific driver 190 with the OFED core 160, one instance per device, e.g., network adapter, is effectively a resource allocator and is more analogous to a Virtual Machine Manager (VMM) than a traditional NIC/FC driver, with the distinction being that the device drivers are dynamic whereas VMM persists for the lifetime of an associated virtual machine (VM). The device driver instances are accessed, by the ULPs, through the verbs of the OFED library 130 and/or OFED core 160 to allocate resources on specific device/device driver pairs, e.g., network adapter/adapter driver pairs.

When a userspace application requests the creation of a RDMA communication pathway between the userspace application and a device, such as an IO adapter, so as to perform RDMA operations, the userspace application creates userspace resources, such as QPs, CQs, PDs, CTXs, and the like, and performs a system call to the operating system kernel which performs operations to register these resources with the device, hereafter referred to as the IO adapter. The operating system kernel essentially communicates the virtual address, length, and other properties of the resources for the communication connection with the userspace application to the IO adapter and then hands-off the responsibility for the data communication between the userspace application and the IO adapter to the IO adapter to thereby facilitate the RDMA operations. Thereafter, the userspace application and the IO adapter communicate with one another via the resources without having to perform copy operations of data to the kernelspace and involve the operating system in such data communications. Control communications may still be passed to the operating system kernel, such as event communications and the like, but data communication is handled via RDMA operations between the IO adapter and the userspace application using the registered resources, e.g., QPs, CQs, and the like.

In addition to creation of the userspace resources, e.g., QPs, CQs, PDs, CTXs, and the like, the operating system kernel further creates a context shadow copy of the userspace context in the kernelspace. The userspace context, and thus, the kernelspace shadow copy of the context, has associated properties, such as memory addresses and length properties. This property information is registered with the kernel and stored in a mapping data structure in kernelspace and may be used to perform lookup operations and identify the locations of the context in the userspace and kernelspace of the system memory. For example, when an error occurs, the error notification from the IO adapter may specify the specific type of error event as well as a resource identifier corresponding to the error event. This resource identifier may be used by a kernelspace adapter driver, for example, to perform a lookup operation of the resource identifier to acquire the address of the kernel shadow copy of the context associated with the resource identifier.

In addition, the kernelspace, when registering the IO adapter, further creates an event queue (EQ) through which the IO adapter may notify the kernel of events that occur with regard to RDMA connections between the IO adapter and userspace applications, e.g., error event notifications may be posted to this EQ.

In accordance with the illustrative embodiments, the hardware (HW) specific library 140 and HW specific device driver 190, which is also referred to herein as a kernelspace IO adapter device driver, perform operations to allocate context data structures having corresponding shared memory data structures for use in providing early warnings of error states of resources associated with the RDMA connection between the application 110 and the IO adapter 180. That is, the application 110, when creating a RDMA connection between itself and the IO adapter 180, may perform a context allocation operation, such as by performing a ibv_alloc_context( ) call to the hardware specific library 140 for example, that causes the hardware specific library 140 to allocate a CTX data structure and corresponding implicit shared memory state substructure containing the state variables for the RDMA connection. The hardware specific library 140 may then call the OFED core 160, such as via a ibv_cmd_alloc_context( ) call for example, to cause the OFED core 160 to generate a kernelspace shadow copy data structure corresponding to the userspace CTX data structure and the shared memory state substructure. Thus, both the userspace 120 and the kernelspace 170 contain a shared memory state substructure for storing state variables for the RDMA connection between the application 110 and the IO adapter 180.

The hardware specific device driver 190 may then be called by the OFED core 160 to perform a cross memory mapping of the shared memory state substructures of the userspace and kernelspace. In this way, the elements of the shared memory state substructure are made visible to both userspace processes and kernelspace processes. The hardware specific device driver 190 may then complete other operations that may be needed, based on the particular implementation, to create a kernelspace CTX shadow data structure. Once created, these shared memory state substructures of the CTX data structure in userspace and the shadow CTX data structure in the kernelspace may be used to signal, via the setting of state variables n the shared memory state substructures, when a resource is in an error state. These state variables may be written to in response to the receipt by the hardware specific device driver 190 of an error event notification, for example. The cross memory mapping services mentioned above may be used to facilitate this writing of state variables as described hereafter.

Figure 2:
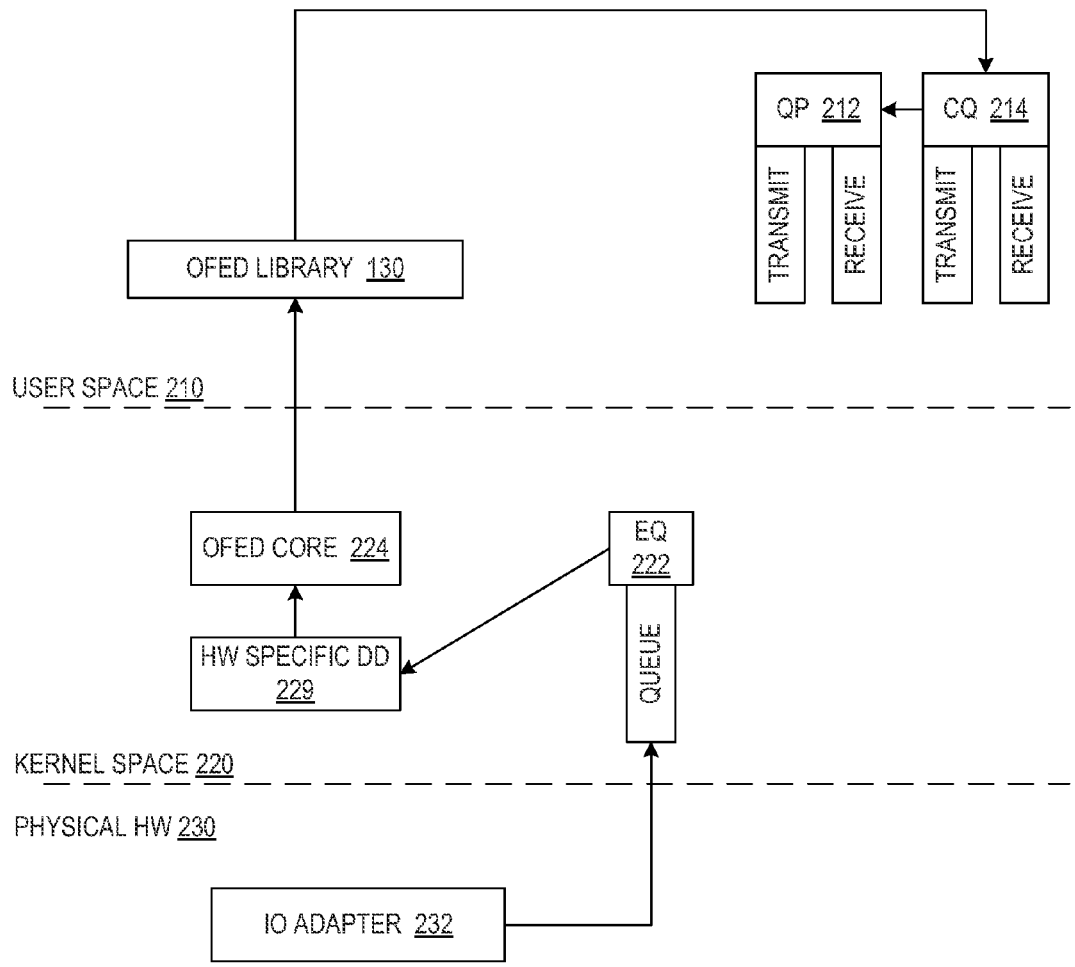
FIG. 2 is an example block diagram illustrating the operation of elements of an OFED™ based architecture with regard to error event notifications being sent from the IO adapter to the host system.

FIG. 2 is an example block diagram illustrating the operation of elements of an OFED™ based architecture with regard to error event notifications being sent from the IO adapter to the host system. As shown in FIG. 2, while the userspace 210 resource, e.g., QP 212 or CQ 214, is operational, events/interrupts occur via an Event Queue (EQ) 222. The events are either notifications of work completions or asynchronous error notifications. Work completion event notifications are sent from the IO adapter 232 in the physical hardware level 230 to the EQ 222 in the kernelspace 220. The hardware specific device driver (DD) 229, e.g., a kernelspace IO adapter device driver associated with the IO adapter 232, reads the EQ entries (EQEs) from the EQ 222 and invokes logic of the OFED™ core 224 processes the events using the OFED™ core 224 services and invoking the OFED™ library 130. For example, if the event notification is a work completion event, the OFED™ core 224 services may invoke the OFED library 130 to perform operations for posting a completion queue entry to the completion queue 214 indicating completion of a work queue entry in a transmit or receive work queue of the QP 212. As a result, the corresponding QP 212 entry is updated to indicate completion of that work request.

If the event notification is an error event, the event notification is again posted to the EQ 222 and read by hardware specific device driver 229 with subsequent invocation of logic of the OFED™ core 224. However, in accordance with the illustrative embodiments, the hardware specific device driver 229 is augmented to include logic for handling error event notifications such that the error state is written to state variables of a shared memory state substructure of a CTX data structure, and shadow CTX data structure, corresponding to the RDMA connection between the application and the IO adapter 232. In this way, the contexts (CTXs) associated with the resources are updated to reflect the error state of the RDMA connection in order to provide the application with an early warning of an impending slow path termination operation on the application's resources.

Figure 3:
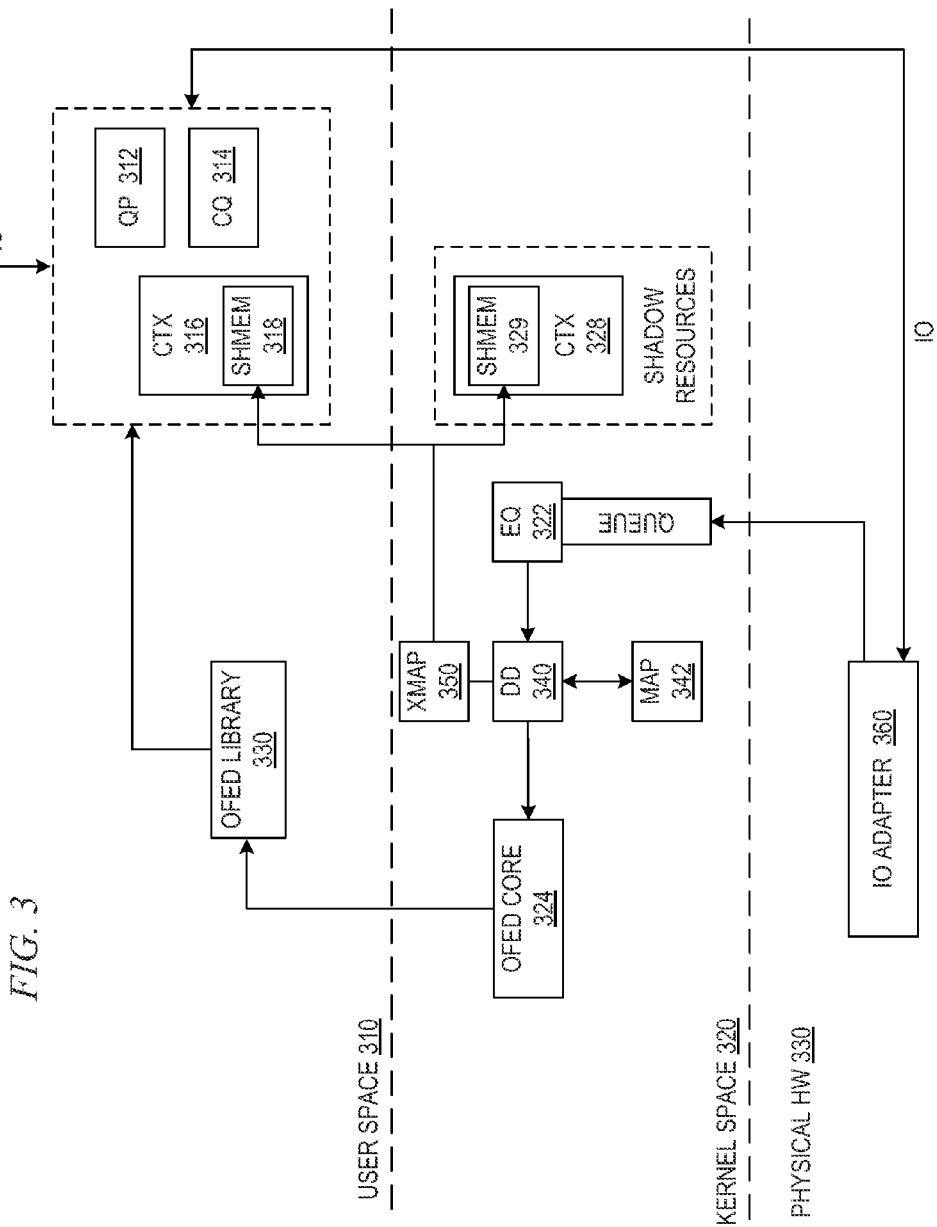
FIG. 3 is an example block diagram of elements and their operation when handling an error notification in accordance with one illustrative embodiment.

FIG. 3 is an example block diagram of elements and their operation when handling an error notification in accordance with one illustrative embodiment. As shown in FIG. 3, in addition to the elements described above with regard to FIG. 2 and the handling of event notifications for work request completions, the illustrative embodiments further provide logic in the kernelspace for handling error notifications from the IO adapter 360 indicating an error event occurring with a RDMA connection between a userspace application 370 and the IO adapter 360. The additional logic is provided, in this example embodiment, in a kernelspace IO adapter device driver (DD) 340 which operates with resource mapping data structure 342 and cross memory (xmap) services 350 associated with the OFED™ core 324 to facilitate the writing of a error state values to error state variables in shared memory state data structures (shmem) 318 and 329. While this example embodiment illustrates the logic being provided in a kernelspace IO adapter device driver 340, it should be appreciated that this is but one example, and the logic may be implemented in many different ways, including as part of the OFED™ core 324, as a separate logic element altogether within the kernelspace 320, or the like.

With reference to FIG. 3, it is assumed that the processes described previously with regard to the creation of a context (CTX) data structure for resources of an RDMA connection has been performed including the creation of the shared memory state data structure of the CTX data structure and the corresponding shadow copy of the CTX data structure and shared memory state data structure in the kernelspace. As such, during normal operation of the system, the userspace application 370 uses the RDMA resources 312, 314 as is generally known in the art to perform RDMA operations between itself and the IO adapter 360. As changes are made to the resources 312, 314, 316 these changes are replicated to the shadow copies 324, 326, 328 as necessary.

When an event occurs in association with a RDMA connection between the application 370 and the IO adapter 332, the IO adapter 360 performs a DMA write operation or an error notification to the event queue (EQ) 322 which results in an interrupt being sent to the host system. This event notification contains the specific event information along with a resource identification for the resource associated with the error event. The resource identification may comprise an enumerated value corresponding to the resource, e.g., QP number, CQ number, or the like, which is assigned to the resource at resource creation time and maintained along with other resource configuration information in the kernelspace 320, such as in the resource mapping data structure 342.

The kernelspace IO adapter device driver 340 reads entries in the EQ 322 and determines if an entry in the EQ 322 corresponds to an error event notification or is some other type of event notification. If the event notification is not an error event notification, the event is passed to the OFED core 324 for processing and updating of corresponding RDMA resources in userspace 310.

If the event notification is an error event notification, e.g., a catastrophic error notification from the IO adapter 360, an ifconfig detatch of the associated IO adapter 360 interface, or the like, the kernelspace IO adapter device driver 340 (hereafter referred to simply as the "device driver" 340) performs a lookup operation in the resource mapping data structure 342 of the resource identifier to retrieve a corresponding entry that identifies the address of the kernelspace shadow copy 324, 326 of the resource associated with the error event notification and the shadow context (CTX) data structure(s) 328 associated with the resource identified by the resource identifier.

The address of the shadow copy of the resource may be associated with the resource identifier of the resource along with the address and length information of the userspace resource, and other configuration information for the userspace resource, in the resource mapping data structure 342. Thus, a lookup of the resource identifier specified in an error event notification posted to the EQ 322 provides the corresponding address of the shadow copies of the userspace resource.

Once the address for the shadow copy of the userspace resource 324, 326, and its corresponding context (CTX) data structure(s) 328, is obtained from the lookup operation, the device driver 340 accesses the cross memory map (xmap) service 350 to obtain the xmap information from when the resource was created to perform a cross memory write operation, by the device driver 340 via the xmap services 350, on the userspace shared memory state data structure (shmem) 318. The cross memory mapping service 350 is a service that facilitates access operations being performed by the userspace application and the operating system kernel on a same portion of memory when normally the userspace application cannot access the kernelspace memory and vice versa.

The cross memory write operation writes an error value to the state variables of the shared memory state data structure 318 to indicate which RDMA resources are in an error state. That is, even though the error notification in the event queue entry (EQE) of the EQ 322 read by the device driver 340 may have indicated a particular resource as being associated with the error event, all related resources to the identified resource must also be torn down and their corresponding memory freed. As such, the related resources may likewise be identified in the shared memory state data structure 318 as being in an error state through the cross memory write operation writing the error value to their state variables as well.

It should be noted that while FIG. 3 illustrates only a single CTX data structure 316 being written to by the cross memory write operation, in some illustrative embodiments, all existing CTX data structures 316 for a RDMA connection may be identified and subjected to the cross memory write operation. That is, the kernelspace IO adapter device driver 340, when performing its lookup operation in the mapping data structure 342, may simply find all currently existing CTX data structures for the RDMA connection associated with the resource identified in the error event notification read from the EQ 322. In such a case, the device driver 340 may then perform a cross memory write operation via the xmap services 350 to each of the shared memory state data structures 318 of the various CTX data structures found as part of the lookup operation. In this way, all resources associate with the RDMA connection will be flagged as being in an error state, thereby permitting concurrent parallel tearing down or destruction of these resources in the userspace 310 prior to the slow path resource termination process being initiated or completed.

Having written the error value to the state variables of the corresponding CTX data structures in the userspace via the cross memory write operation, when the userspace application 370 again attempts to utilize the resources to perform an RDMA operation, the userspace application 370 will detect the error state when it performs its call into any of the hardware specific library entrypoints. That is, the hardware specific library, such as hardware specific library 140 in FIG. 1, checks the shared memory state data structure 318 in response to a call from the application 370 to perform an RDMA operation in order to ensure that the resources needed to perform the RDMA operation are not in an error state. Upon checking the shared memory state data structure 318, since the error value has been written to the shared memory state data structure 318 by virtue of the cross memory write operation, the hardware specific library will detect that the resources are in an error state and notify the application 370 which will initiate a userspace termination of the resources associated with the RDMA connection. Concurrent parallel destruction or tearing down of these resources is enabled via whichever concurrency level the application 370 is using on its calls to the hardware specific library.

The error event notification read by the device driver 340 may still be provided to the OFED core 324 for processing using calls to the OFED library 330. This processing will entail the slow path termination processing involving file descriptor close operations and the like. These operations will be performed primarily with regard to idle userspace applications and resources not being utilized since active applications and resources will have already been notified of the error state via the fast path cross memory write operations performed to the shared memory state data structures. It should be appreciated, however, that even the slow path termination operations have their execution times shortened since the slow path termination operations are only performed on the resources not already torn down or destroyed by the userspace applications in response to the early warnings obtained from the shared memory state data structures. As a result, the slow path termination operations for performing file descriptor close operations act as a fail safe operation to tear down or destroy any resources not already torn down or destroyed by the userspace application.

Thus, the illustrative embodiments provide mechanisms for providing a fast-path userspace RDMA resource tear down operation in response to a detection of an error event. The illustrative embodiments significantly increase the speed at which these tear down operations of RDMA resources is achieved by providing early warning of the need to perform a slow-path termination operation of resources using file descriptor close operations. This early warning allows the userspace application to initiate the tear down of userspace resources well in advance of the slow path operations being initiated or completed.

Figures 4A, 4B, 4C:
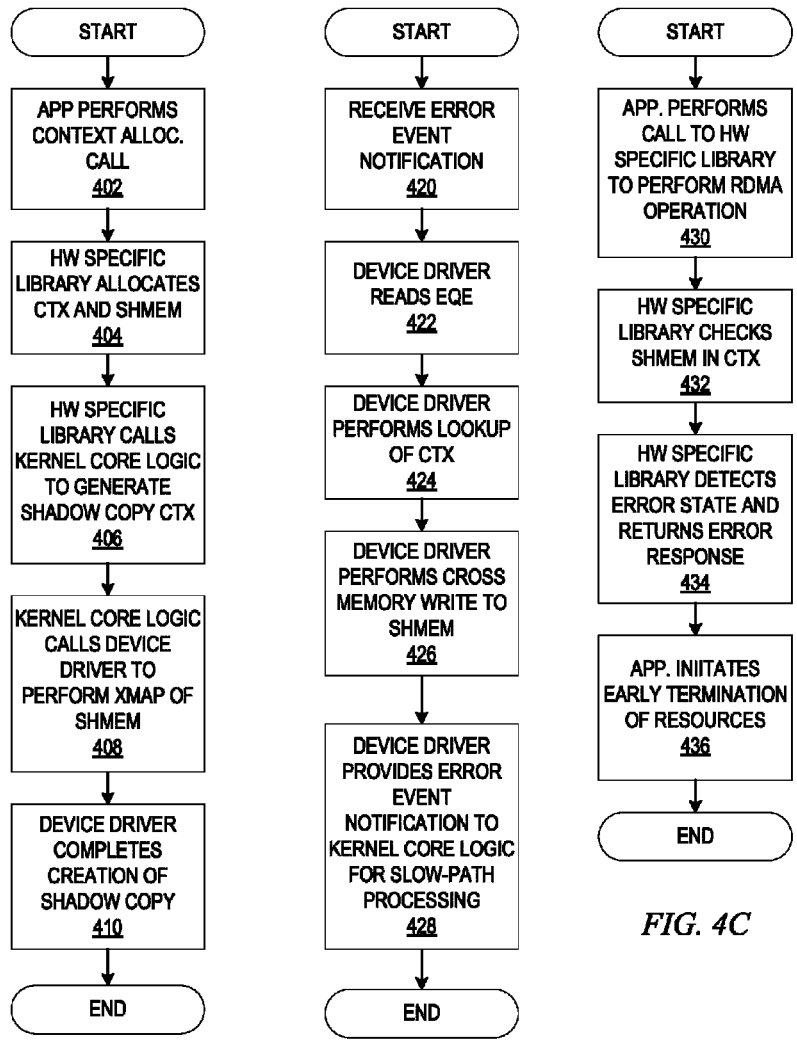
FIG. 4A is a flowchart outlining an example operation for creating a shared memory state data structure in accordance with one illustrative embodiment.
FIG. 4B is a flowchart outlining an example operation for performing a cross memory write operation to a shared memory state data structure in accordance with one illustrative embodiment.
FIG. 4C is a flowchart outlining an example operation for handling an error state identified in a shared memory state data structure in accordance with one illustrative embodiment.

FIG. 4A is a flowchart outlining an example operation for creating a shared memory state data structure in accordance with one illustrative embodiment. As shown in FIG. 4A, as part of the establishment of an RDMA connection with an IO adapter, the userspace application performs a userspace context allocation call to a hardware specific library that is specific to the type of IO adapter being utilized (step 402). The hardware specific library allocates a context (CTX) data structure and corresponding shared memory state substructure containing state variables for the resources associated with the RDMA connection (step 404). The hardware specific library performs a context allocation call to the kernel core logic, e.g., OFED core logic, to generate a kernelspace shadow copy data structure corresponding to the userspace CTX data structure, including the shared memory state substructure (step 406). The kernel core logic calls a kernelspace device driver for the IO adapter which invokes cross memory mapping (xmap) services in the kernel space to cross memory map the shared memory state structures (step 408). The kernelspace device driver then completes other standard operations for creating a kernelspace CTX shadow data structure (step 410) and the operation terminates.

FIG. 4B is a flowchart outlining an example operation for performing a cross memory write operation to a shared memory state data structure in accordance with one illustrative embodiment. As shown in FIG. 4B, the operation starts by receiving an error event notification posted to the event queue (step 420). This error event may be an EEH, a catastrophic error notification from the IO adapter, a ifconfig detatch of an associated IO adapter interface, or the like. The kernelspace device driver reads the event queue and retrieves the error event notification from an event queue entry (step 422). The kernelspace device driver performs a lookup operation for looking up all existing context (CTX) shadow structures associated with the resource, and thus the RDMA connection, that is identified in the error event notification (step 424). The kernelspace device driver then performs a cross memory write operation on the userspace shared memory state data structure, thereby writing an error state value to the state variables for the resource(s) of the RDMA connection (step 426). The error event notification is passed to the kernel core logic, e.g., OFED core, for processing as part of a slow-path termination operation using file descriptor close operations and the like (step 428). The operation then terminates.

FIG. 4C is a flowchart outlining an example operation for handling an error state identified in a shared memory state data structure in accordance with one illustrative embodiment. As shown in FIG. 4C, the operation starts with a userspace application performing a call to a hardware specific library entrypoint to perform a RDMA operation (step 430). The hardware specific library checks the shared memory state data structure of a context data structure corresponding to the RDMA connection that is the subject of the RDMA operation (step 432). The hardware specific library detects the error state or the resources associated with the RDMA connection and returns an error response to the application (step 434). The userspace application initiates early termination of all resources associated with the RDMA connection (step 436). This termination may be performed concurrently and in parallel for a plurality of resources associated with the RDMA connection. The operation then terminates.

Figure 5:
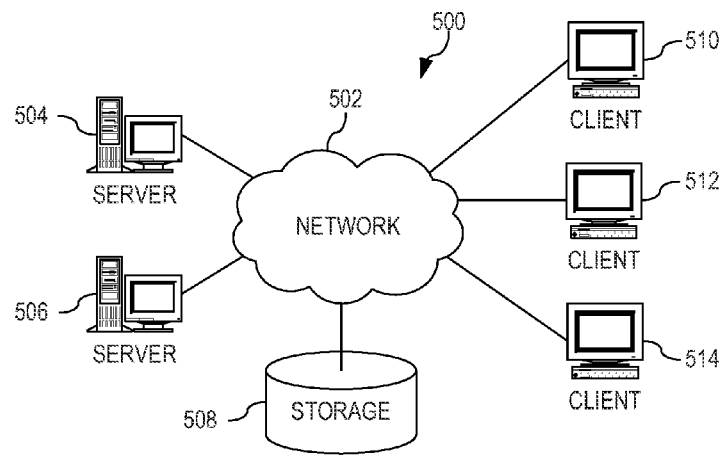
FIG. 5 is an example diagram of a distributed data processing system in which aspects of the illustrative embodiments may be implemented.
Figure 6:
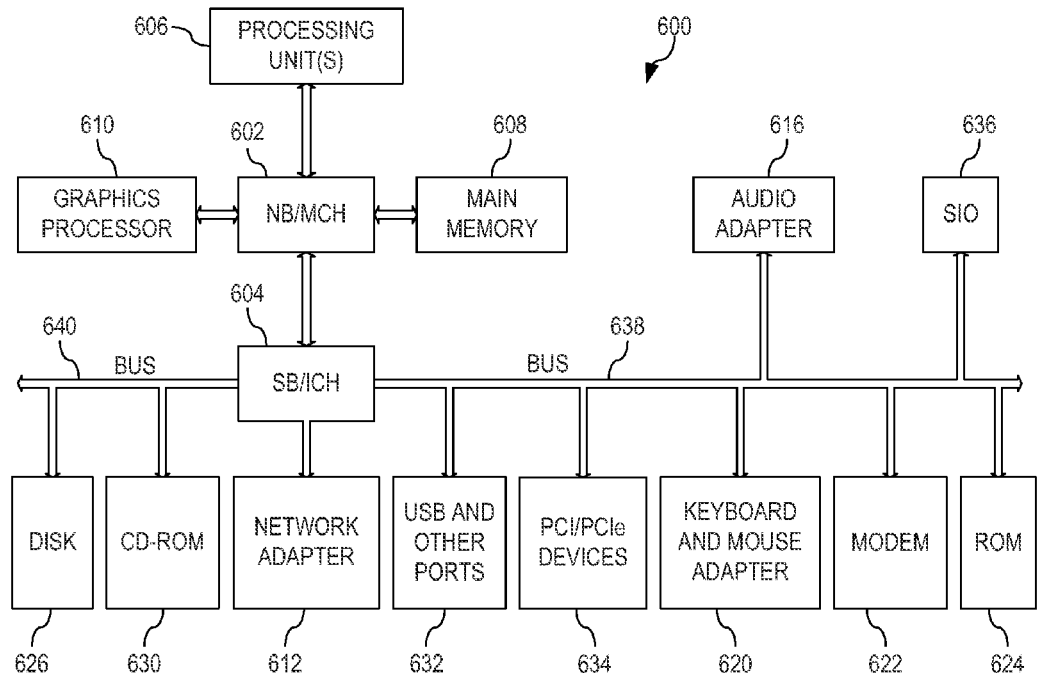
FIG. 6 is an example block diagram of a computing device in which aspects of the illustrative embodiments may be implemented.

It should be appreciated that the illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

FIG. 6 is a block diagram of an example data processing system in which aspects of the illustrative embodiments may be implemented. Data processing system 600 is an example of a computer, such as client 510 or server 504 in FIG. 5, in which computer usable code or instructions implementing the processes for illustrative embodiments of the present invention may be located.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 226 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 600.

As a server, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

In accordance with the illustrative embodiments described herein, the operating system kernel and corresponding kernelspace may implement core logic that supports RDMA operations and provides the additional logic for performing operations to facilitate early warnings to userspace applications of error events having occurred. As described above, these operations may include performing cross memory write operations from kernelspace logic to userspace shared memory state data structures to thereby write error state values into state variables of the userspace shared memory state data structures. In this way, the userspace application is informed early on that RDMA resources are in an error state, such as when the userspace application again attempts to perform a RDMA operation, and can begin tearing down or destroying the resources in advance of a slow-path file descriptor close operation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for providing an early warning of an error state of a remote direct memory access (RDMA) resource to a userspace application, the method comprising:
   detecting, by kernelspace logic resident in a kernelspace of the data processing system, an error event having occurred;
   performing, by the kernelspace logic, a write operation to write an error state value to a userspace shared memory state data structure indicating the RDMA resource to be in an error state;
   detecting, by userspace logic of the data processing system, the RDMA resource being in an error state by reading the error state value from the userspace shared memory state data structure in response to a userspace application attempting to perform a RDMA operation using the RDMA resource; and
   initiating, by the userspace logic, an operation to tear down the RDMA resource in response to detecting the RDMA resource being in the error state.

2. The method of claim 1, wherein the userspace shared memory state data structure is an extension of a userspace context data structure and is cross-memory mapped to be accessible by both userspace applications and the kernelspace logic via cross-memory map services provided in the kernelspace.

3. The method of claim 2, wherein the userspace shared memory state data structure is accessible by the kernelspace logic via a shadow copy of the userspace context data structure, and corresponding userspace shared memory state data structure, in the kernelspace.

4. The method of claim 3, further comprising:
   detecting, by a kernelspace IO adapter device driver, the RDMA resource being in an error state; and
   in response to the kernelspace IO adapter device driver detecting the RDMA resource being in an error state:
   traversing a list of shadow copies of userspace context data structures; and
   performing a cross-memory write of state information of the RDMA resource to each userspace context data structure corresponding to a shadow copy of userspace context data structures associated with the RDMA resource.

5. The method of claim 1, wherein the userspace logic checks the state of the RMDA resource, by reading the userspace shared memory state data structure, on every RDMA entrypoint into the RDMA resource.

6. The method of claim 1, further comprising posting, at substantially a same time as the detecting operation being performed, an error notification to an event queue of the data processing system, so as to initiate a slow-path RDMA resource termination operation comprising file descriptor close operations.

7. The method of claim 6, wherein, as part of the slow-path RDMA resource termination operation, in response to encountering a related RDMA resource that has already been terminated by the userspace logic in response to the detecting of the RDMA resource being in an error state, the slow-path RDMA resource termination operation skips the related RDMA resource during performance of the slow-path RDMA resource termination operation.

8. The method of claim 1, wherein detecting the error event comprises receiving an error event notification, and wherein the error event notification is one of an error notification from an Input/Output (IO) adapter, an ifconfig detatch event, or a Enhanced Error Handling (EEH) event.

9. The method of claim 1, wherein the kernelspace logic comprises a hardware specific device driver.

10. The method of claim 9, wherein the hardware specific device driver is an Input/Output (IO) adapter device driver, and wherein the userspace logic is a userspace application associated with the RDMA resource.

* * * * *